United States Patent
Suvanen

(10) Patent No.: US 6,633,536 B1
(45) Date of Patent: Oct. 14, 2003

(54) SIGNALLING IN A DIGITAL MOBILE COMMUNICATIONS SYSTEM

(75) Inventor: Jyri Suvanen, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/254,890

(22) PCT Filed: Sep. 16, 1997

(86) PCT No.: PCT/FI97/00552

§ 371 (c)(1),
(2), (4) Date: Apr. 8, 1999

(87) PCT Pub. No.: WO98/12893

PCT Pub. Date: Mar. 26, 1998

(30) Foreign Application Priority Data

Sep. 17, 1996 (FI) ................................................ 963677

(51) Int. Cl.[7] ................................................ H04Q 7/38
(52) U.S. Cl. ........................................ 370/216; 370/242
(58) Field of Search .............................. 370/216, 242; 714/704, 755, 795; 704/214, 226

(56) References Cited

U.S. PATENT DOCUMENTS

| | | | | | |
|---|---|---|---|---|---|
| 5,321,705 A | * | 6/1994 | Gould et al. | .................. | 714/795 |
| 5,497,383 A | * | 3/1996 | Thome et al. | ............... | 714/704 |
| 5,757,810 A | * | 5/1998 | Fall | ............................ | 714/704 |
| 5,815,507 A | * | 9/1998 | Vinggaard et al. | .......... | 714/704 |
| 5,862,518 A | * | 1/1999 | Nomura et al. | .............. | 704/214 |
| 6,092,230 A | * | 7/2000 | Wood et al. | ................. | 714/755 |
| 6,144,936 A | * | 11/2000 | Jarvinen et al. | ............. | 704/226 |

* cited by examiner

Primary Examiner—Salvatore Cangialosi
(74) Attorney, Agent, or Firm—Pillsbury Winthrop LLP

(57) ABSTRACT

A method and a transmitter (100) and a receiver (102) for transmitting messages (114) in a digital telecommunications system. The information (104) to be sent is encoded in an information encoder (106) of the transmitter (100) into frames that are transmitted via a transmission path (108) to the receiver (102). A good state and a bad state have been defined for the frames, and a bit pattern corresponding to each message (114) has been defined. The messages(114) are encoded with a message encoder (116) of the transmitter (100) and transmitted to the receiver (102). The messages (114) are transmitted together with the information (104) via a common transmission path (108), inserting the bit pattern corresponding to the message (114) in the frame, forming the frame corresponding to the time of transmitting the message (114) as bad, and in short sequences, preferably only one frame at a time. The messages thus transmitted can be received together with the information (104) via a common transmission path (108) simply by detecting a bad frame that additionally contains a bit pattern deviating from the bit pattern corresponding to the message in a few bits at most. The bad frames corresponding to the time of message transmission are replaced with a preceding good frame.

24 Claims, 3 Drawing Sheets

SIGNALLING IN A DIGITAL MOBILE COMMUNICATIONS SYSTEM

This application is the national phase of international application PCT/FI97/0552, filed Sep. 16, 1997 which designated the U.S.

BACKGROUND OF THE INVENTION

The present invention relates to a signalling protocol and an apparatus enabling a transmitter in a speech-transmitting digital telecommunications system to transmit predetermined messages to a receiver. In many digital telecommunications systems, it is necessary to transmit not only encoded speech and/or other information but also messages that may for example relate to the control of that particular connection or that may transfer data fully independent of the information to be transmitted. Such messages are often called signalling. To provide an illustrative description within the scope of this application, the term "speech" is used even though the information to be transmitted in the system may comprise other types of sound, music, a video signal, multimedia, etc. instead of or in addition to speech. In terms of a practical embodiment, the invention is disclosed in the context of a mobile communications system, particularly a speech channel in the GSM system. It is to be borne in mind, however, that the technology in accordance with the invention is suitable for use in many other environments as well.

FIG. 1 shows the parts of a cellular mobile communications system essential for understanding the invention. Mobile stations MS communicate with Base Transceiver Stations BTS over the air interface Um. The base stations are controlled by Base Station Controllers BSC associated with Mobile Services Switching Centres MSC. A subsystem administered by a base station controller BSC—including the base stations BTS controlled by it—is commonly called a Base Station Subsystem BSS. The interface between an exchange MSC and a base station subsystem BSS is called the A interface. The part of the A interface on the MSC side is called a Network Subsystem NSS. The interface between a base station controller BSC and a base station BTS is called the Abis interface. The mobile services switching centre MSC switches incoming and outgoing calls. It performs tasks similar to those of the exchange of a public switched telephone network PSTN. Additionally, it performs tasks characteristic of mobile telecommunications only, such as subscriber location management, in co-operation with network subscriber registers (not separately shown in FIG. 1). A Transcoder and Rate Adaptation Unit TRAU is an element of the base station subsystem BSS and may be located in association with the base station controller BSC, as shown in this figure, or also in association with the mobile services switching centre, for example. The transcoders convert speech from digital format into another format, for instance convert the 64 kbit/s A-law PCM from the exchange over the A interface into encoded speech of 13 kbit/s to be sent to the base station line and vice versa. Rate adaptation for data is carried out between the rate 64 kbit/s and the rates 3.6, 6, or 12 kbit/s.

In digital telecommunications systems transmitting speech, a speech signal is usually subjected to two coding operations: speech coding and channel coding. Speech coding comprises speech encoding performed in the transmitter by a speech encoder, and speech decoding performed in the receiver by a speech decoder.

FIG. 2 illustrates various operations to be performed on the speech. The most significant steps in view of the present invention include speech encoding and decoding and channel encoding and decoding. In the GSM system, for example, channel encoding in the network is performed at the base station, whereas speech encoding is performed in a discrete transcoder unit that may be located remote from the base station and even when located at the base station is a fully separate logic unit. References Tx and Rx will be explained in connection with FIG. 4. FIG. 2 further illustrates an exemplary frame F, comprising a header H, a payload portion P, and a check portion C. The frame F also often contains bit patterns for synchronization. The header H typically comprises the identifiers of the sender and receiver of the frame, a consecutive number for the frame, or the like. The actual information is carried in the payload portion P. Parts essential to the present invention include the payload portion P and the check portion C. The check portion C is usually implemented in the form of a cyclic redundancy check (CRC) value, but it may also be a parity having one or more bits, or equivalent. Essential to the invention is mainly the fact that the system in some way defines a "good" and a "bad" frame, which may be distinguished from one another by means of an implicit or explicit information element in the frame, permitting the system to conclude whether the frame has been transferred correctly. In the present context, "implicit" means that, as is well-known, the cyclic redundancy check (CRC) value does not directly indicate whether the frame is good or bad, but the receiver calculates the CRC value from the frame and compares it with the check sum sent with the frame. If the check sums are identical, the frame is good. An "explicit" indicator of a bad frame is for instance the Bad Frame Indicator BFI used in the fixed parts of a telephone network.

FIG. 3 illustrates the type of message transmission most widely known in the art. FIG. 1 shows both a transmitter 100 and a receiver 102. In this arrangement, messages and speech are transmitted on completely different channels. In the transmitter 100, a digital speech signal 104 is supplied to a speech encoder 106, which, from this signal, generates compressed speech coding bits, which are sent to the receiver on a speech channel 108. In the transmitter, a message 114 to be sent to the receiver is supplied to a message encoder 116, which generates message bits, which are then sent to the receiver on a separate message channel 118. The receiver 102 receives the speech coding bits from a speech channel 108 and supplies them to a speech decoder 110, which synthesizes the speech signal 112 to be heard. The receiver 102 receives the message bits from a separate message channel 118 and supplies them to a message decoder 120, which interprets the transmitted message 122.

A speech encoder 106 located in a transmitter 100 compresses a speech signal so that the number of bits used to represent it per unit of time is reduced. The speech encoder 106 typically processes speech as speech frames containing a certain amount of speech samples. On the basis of sampled speech, the speech encoder 106 calculates speech parameters, each of which is encoded as a separate binary code word. The speech parameters produced by the RPE-LTP speech encoder used in the full-rate channel of the pan-European GSM mobile telephone system are described in ETSI GSM Recommendation 06.10. These parameters are also disclosed in Table 1 of Appendix 1. The RPE-LTP (Regular Pulse Excitation—Long Term Prediction) produces 76 speech parameters from one speech frame of 20 ms (corresponding to 160 speech samples at a sampling frequency of 8 kHz). Recommendation GSM 06.10 also discloses the length of the binary code word assigned for each parameter.

Very often speech encoders also group speech parameters together, in which case each group—instead of a single speech parameter—is encoded into a separate code word. Encoding parameters in groups is called vector quantization. Modem speech encoders usually encode some speech parameters separately and some in groups (the RPE-LTP speech encoder of the example does not employ vector quantization). The RPE-LTP speech encoder of the invention produces 260 speech coding bits per each speech frame of 20 ms.

The speech decoder 110 of a receiver 102 performs a reverse operation and synthesizes a speech signal 112 from the bits produced by the speech encoder. The decoder 110 receives binary code words and generates corresponding speech parameters on the basis of them. The synthesization is performed by the use of the decoded speech parameters. The speech synthesized in the receiver is, however, not identical with the original speech compressed by the speech encoder, but it has changed more or less as a result of the speech coding. The higher the degree of compression used in the speech coding, the more the quality of speech usually deteriorates in the coding process.

The RPE-LTP speech encoder, for example, compresses a speech signal to a rate of 13 000 bits per second (13 kbps). The compression is performed in such a way that it affects the intelligibility of speech as little as possible. In special cases, such as identification of tone pairs used in tone dialling, the compression may detrimentally affect or even completely obstruct the process.

The above-mentioned channel coding comprises channel encoding performed in the transmitter by a channel encoder, and channel decoding performed in the receiver by a channel decoder. The purpose of channel coding is to protect speech coding bits to be transmitted against errors occurring on the transmission channel. Channel coding may either allow transmission errors to be detected without being able to correct them or it may allow transmission errors to be corrected, provided that the number of errors is smaller than a certain maximum number, which is dependent on the channel coding method.

The channel coding method to be used is selected according to the quality of the transmission channel. In fixed transmission methods, the error probability is often very small, and there is not much need for channel coding. In wireless networks such as mobile telephone networks, however, the error probability is often extremely high, and the channel coding method employed has a significant effect on the quality of speech. In mobile telephone networks, both error-detecting and error-correcting channel coding methods are usually employed simultaneously.

In telecommunications systems transmitting speech, speech coding and channel coding are closely connected. The importance of bits produced by a speech encoder for the quality of speech usually varies such that, in some cases, an error in an important bit may cause an audible disturbance in synthesized speech, whereas several errors in less important bits may be almost imperceptible. How great the difference between the importance of speech coding bits is depends essentially on the speech coding method employed, but at least small differences can be found in most methods. When a speech transmission method is developed for a telecommunications system, channel coding is thus designed together with speech coding to allow better protection for bits most important to the quality of speech than for less important bits. In a full-rate channel of the GSM, for example, the bits produced by an RPE-LTP speech encoder have been divided into three different classes according to their importance to channel coding: the most important class is protected in channel coding with both an error-correcting and an error-detecting code; the second most important class is protected with an error-correcting code only; and the least important class is not protected in channel coding at all. Table 2 of Appendix 1 shows the classification of bits produced by an RPE-LTP encoder in two different ways: 6-parted subjective classification, and 3-parted classification used by channel coding.

Channel coding is not directly relevant to the principle of the invention. In view of speech coding, channel coding is part of the transmission channel. In view of the practical implementation, channel coding is, however, of essential significance to the transmission of messages as regards the selection of bits, as will be seen from the examples below.

The term "channel" can be interpreted in many ways in the field, wherefore the meaning of the term for the present invention can be specified as follows. When messages and speech are transmitted on separate channels, the receiver can distinguish between message bits and speech coding bits irrespective of the content of the information transmitted on the channels. However, two channels are not necessarily physically separate channels. Separate channels can also be provided by dividing one physical transmission channel (e.g. a radio path or a transmission line) into a plurality of time slots and frequency ranges. When such a division is made unambiguously, the receiver can distinguish between the channels irrespective of the content of the information transmitted on them.

A problem arises when the telecommunications system is to be changed in a way that was not anticipated when the system was planned. Let us assume, for example, that more than two speech codecs are to be used in a GSM system. Signalling for this kind of selection has not been designed in the system, and if it is designed afterwards, it cannot be implemented in old equipments that are already in use. To solve this problem, it is necessary to have a signalling method that can be introduced into an existing telecommunications system without disturbing those equipment in use in which this signalling method is not implemented. Using such a method, new equipments can signal with each other to agree on the use of a new codec; the signalling will not be successful with old equipment, and thus the new equipment can conclude that the old speech codec must be used on the connection. Message transmission methods previously used in the field do not usually allow messages to be added to an existing system.

It is possible to design various signalling possibilities for unpredictable cases in advance. If such a signalling possibility exists in the system, it should primarily be usedy. However, such reserve signalling does not often exist, or its introduction may require a time-consuming standardization process. Since there is, in any case, a limited number of reserve signalling possibilities, such signalling cannot be introduced very lightly.

An example of signalling that is designed in advance is the use of a speech coding method. Since the speech encoder of the transmitter and the speech decoder of the receiver must use the same speech coding method, the equipments must agree on the method to be used when the speech connection is being established. Such a situation will arise in the GSM system, for example, where a half-rate speech codec will soon be introduced in addition to the full-rate speech codec. In the GSM system, the problem of selecting the speech codec has been solved in such a way that when the system was planned, it was already known that there would be two speech codecs even though only one of them is implemented in the present equipments. A signalling method for selecting the speech codec has already been designed in the system in advance. The signalling is implemented in the present equipments, and when new equipments with two speech codecs are introduced later, the new equipments can use the old speech codec when communicating with the old equipments, since the selection of a speech codec is implemented in both the old and the new equipments.

Similar message transmission is needed for example in negotiations on the use of an echo canceller. On end-to-end connections of a data transmission system, e.g. a telephone network, long propagation delays often occur, as a result of which an echo is detected for example in the case of normal speech when a signal is reflected from the remote end of the connection back to the transmitting party. Mainly two factors contribute to the generation of an echo: acoustic echo between the receiver and the microphone of a telephone, and electrical echo which is generated in the transmission systems of the transmission and reception directions of the connection. It is usually endeavoured to eliminate the problems caused by the returned echo by means of an echo canceller. An echo canceller is a device processing a signal, such as a speech signal, that serves to reduce the echo by subtracting the estimated echo from the echo (signal) occurring on the connection. An echo suppresser, in turn, disconnects the signal arriving from the remote end when an echo is present.

Present-day digital mobile communications systems are provided with echo cancellers that prevent an echo returning from the public switched telephone network (PSTN) from being transmitted to the mobile subscriber. In mobile exchanges, echo cancellers of this kind are usually located in the inter-exchange trunk circuits.

An echo returning from a mobile station is usually cancelled by means of an echo canceller located in the actual mobile station. Such an echo canceller is usually based on an adaptive filter or on comparing the levels of an output signal and an input signal. There are a wide variety of mobile stations in use nowadays in which the echo cancellation does not work sufficiently well, but a relatively low-level, yet disturbing, echo is transmitted to the other party. In principle, the problem can be alleviated by developing echo elimination methods for mobile stations, but this mainly improves the situation as far as new mobile stations are concerned. It is difficult, however, to update the software or equipment of mobile stations that are already in use, because the mobile stations are already in possession of their users, and collecting them for service measures is time-consuming and costly. In a mobile communications system, there will thus always be such mobile stations whose echo elimination does not work sufficiently well, but causes a disturbing echo to the other party. If, on the other hand, the echo canceller in the mobile station is sufficiently good, it is unnecessary to perform a new echo cancellation operation in the fixed parts of the network. This could also deteriorate speech quality.

Similar negotiations may also be conducted when the use of a noise canceller is negotiated on. It is also to be be presumed that similar needs will subsequently arise when new features are incorporated into mobile communications systems.

For the above and similar situations, the mobile communications system needs a mechanism by which the sender and receiver (e.g. a mobile station and a transcoder) can send messages to one another, for example when informing one another of their type and/or in negotiating with one another on the speech coding or echo cancellation method to be employed.

It is known to use the same physical transmission channel to transmit both speech and digital information. For example U.S. Pat. No. 4,476,559 (Berlin et al.) teaches a technique suitable for fixed networks wherein one of three transmission modes (voice, data, or a combination thereof is selected, and an identifier for indicating the chosen transmission mode is formed. In Berlin, this identifier is called "a unique signature". This signature is multiplexed with the transmit signals for identification of the transmission mode. However, there are several reasons why the solution offered by said U.S. Patent (Berlin) is not suitable in an environment where the present invention is intended to be used. First, in accordance with said U.S. Patent (Berlin), a portion of the bandwidth is reserved at all times for indicating the chosen transmission mode, wherefore the entire bandwidth is not available for transmitting speech, not even when there are no messages to be transmitted. In a mobile communications system, and particularly at the air interface thereof, this would be an intolerable limitation. Second, the technique of said U.S. Patent (Berlin) is based on the assumption that the unique signature indicating the transmission mode can always be received faultlessly. In a transmission over the air interface, such an assumption cannot be made.

SUMMARY OF THE INVENTION

Therefore, it is an object of the present invention to provide a signalling protocol and an apparatus implementing a signalling protocol wherewith new functional features can be added to an existing mobile communications system and negotiations can be conducted on the use of these features. Equipment already installed in the system ("old" apparatus) and the users thereof should be disturbed as little as possible. The messages must be formed in such a way that they can be received with maximum reliability. The objects of the invention are achieved with a method, signalling, and an apparatus that are characterized by what is set forth in the characterizing portions of the independent claims. The preferred embodiments of the invention are set forth the dependent claims.

The invention is based on the idea that in transmission over the air interface, part of the frames are corrupted anyway. Change of one speech frame may cause a perceptible snap in the speech. However, the listener can infer the missing information from the context. To correct transmission errors, mobile communications systems have usually implemented mechanisms for replacing bad speech frames (for example, entirely or partly with a preceding good speech frame). When this technique is used, the missing of one frame is normally not even detected. As was stated above, a "speech frame" generally means a frame that is used in the system concerned to transmit information, such as speech, music or other sound, a video signal, or multimedia. A "bad" frame within the context of the present application means a frame wherefrom the receiver can conclude that the frame should not be treated as a normal good frame. In the case of the exemplary GSM system, a bad frame can be detected by means of the cyclic redundancy check (CRC) value.

In accordance with the invention, messages are transmitted in a common channel with the information to be sent from the transmitter to the receiver in such a way that the speech frame corresponding to the message is marked as bad (for example by inserting a faulty CRC value in the frame), and the bit pattern corresponding to the message is inserted in one or more frames. Frames are "stolen" for message transmission only for very short periods of time and only for the exact duration of the message transmission, whereas at other times the entire channel is normally available for information transfer. In the present context, the concept of a "short-term message" means a message that is so short—usually having the length of one speech frame only—that it can be sent in the same channel with the information to be transmitted, without the intelligibility of the receive signal being substantially impaired. In practical situations, the message transmission in accordance with the invention does not normally impair the quality of the reception at all. This is due to the fact that such messages are mainly needed at the very start of the connection only, when the sender and receiver (e.g. a mobile station and a fixed network part) negotiate on the use of a speech codec, an echo canceller and/or a noise canceller. Such negotiations can be conducted during the setup of the signalling connection but prior to the parties initiating the actual information transfer, e.g. speech. If the call is placed in a mobile communications system and the user of the mobile station moves to the service area of another base station and/or transcoder during the call, the negotiations must naturally be re-conducted during the call. Even in that case, the technique for replacing bad speech frames which is commonly used in mobile communications networks will mask the message, so that the effect on speech quality is practically non-existent.

Occasional messages—for example for selecting a speech codec and for controlling an echo canceller or a noise canceller—will be very short. In such a case, the bandwidth employed for speech is not appreciably reduced, even though redundancy is added to the messages to correct transmission errors. Redundancy may be added for example by utilizing channel coding which is also otherwise effected in the system and which in the case of the exemplary GSM system is implemented with convolutional coding. Other ways of adding redundancy are disclosed in connection with the preferred embodiments of the invention.

The advantages of the signalling method of the present invention include first of all the fact that it allows new properties to be added to existing telecommunication systems. A system may comprise both "new" equipment (in which signalling in accordance with the invention is implemented) and "old" equipment (which do not comprise the technique of the invention). When a new device communicates with another new device, messages in accordance with the invention are transmitted between the transmitter and the receiver without disturbing the speech connection. When a new device communicates with an old device, the messages transmitted by the new device are not received, but the speech connection is not disturbed either. A receiver employing the method of the invention can detect a message coded into the speech frame and interpret it without the speech connection being essentially disturbed; no further information is required for detecting the message. No special speech frame corresponding to the "unique signature" of the above-mentioned U.S. Patent is thus required in the present invention to indicate whether information on the channel is to be interpreted as speech or as a message. A receiver in which the message transmission of the invention is not implemented cannot detect a message coded among speech coding bits, but the existence of the message does not essentially disturb the speech connection. The messages are identified simply in such a way that the receiver detects a bad speech frame and examines whether it contains bit patterns deviating from a predetermined bit pattern corresponding to the message in a few bits at most. Since the messages in accordance with the invention are transferred in a channel assigned for user traffic, the messages may have freely selected bit patterns. Hence, no risk can arise for any standardizing body in the field to reserve a bit pattern corresponding to a message in accordance with the invention for a specific use.

Since the entire channel is normally available for speech transmission except for the moment of sending the message, the technique in accordance with the invention does not reduce the capacity of the speech channel. In theory, the technique of the invention slightly reduces speech quality at the time of sending the message, but experience has shown that the listener is not capable of detecting the missing of one speech frame if the bad or missing speech frame is replaced with a preceding good speech frame. On account of the advantageous selection of redundancy and bit patterns corresponding to the messages, the technique in accordance with the invention is reliable against transmission disturbances.

BRIEF DESCRIPTION OF THE DRAWINGS

The invention will be explained in greater detail in the following by means of preferred embodiments with reference to the accompanying drawings, in which.

DETAILED DESCRIPTION OF THE INVENTION

Figure 1:
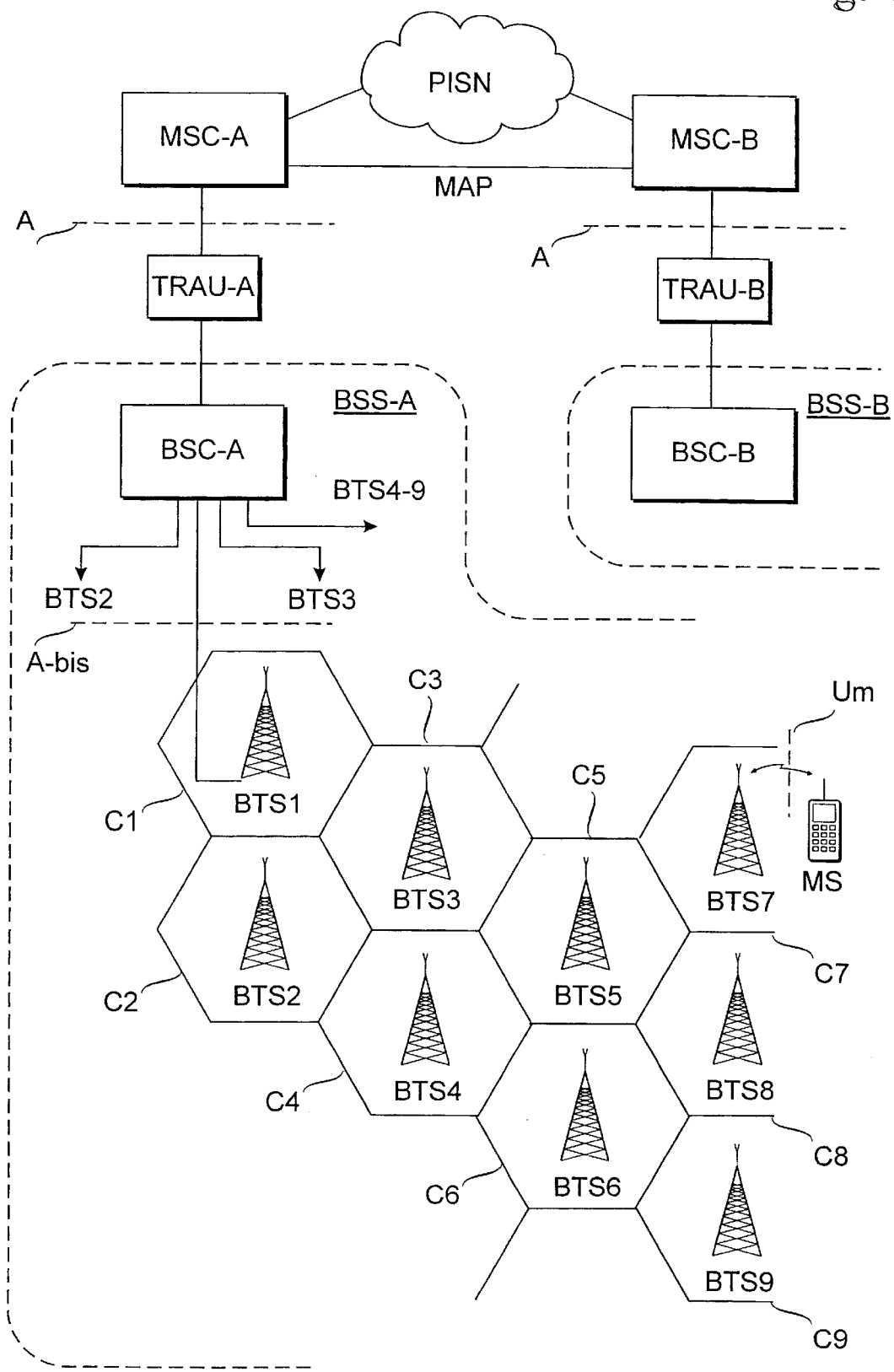
FIG. 1 shows the parts of a cellular mobile communications system essential to the invention.
Figure 2:
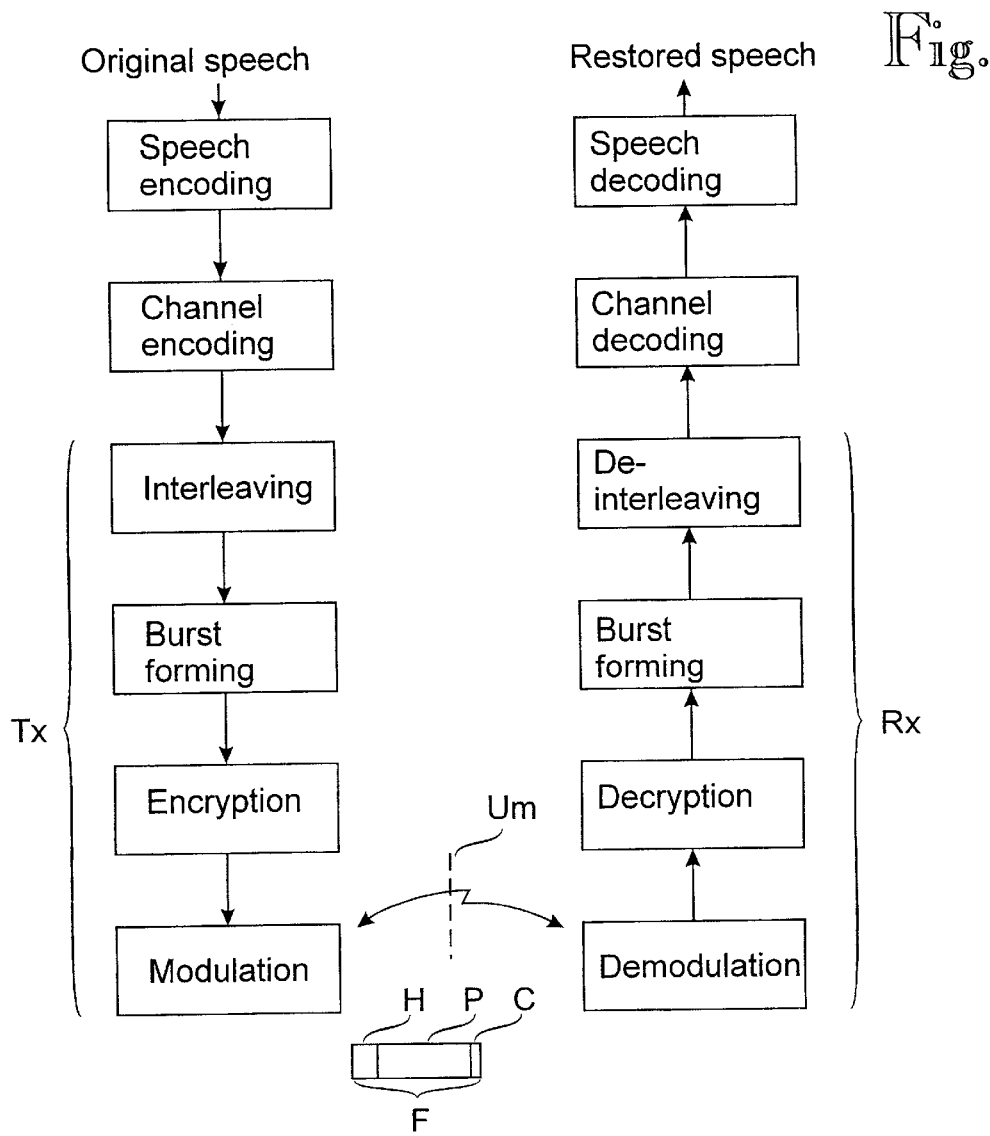
FIG. 2 shows different operations to be carried out on speech.
Figure 3:
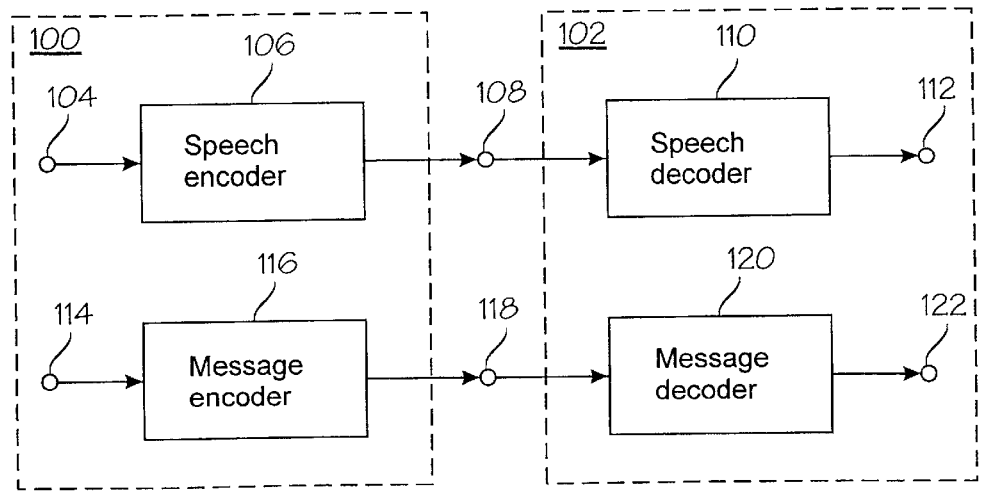
FIG. 3 shows the prior art for transmitting speech and messages.
Figure 4:
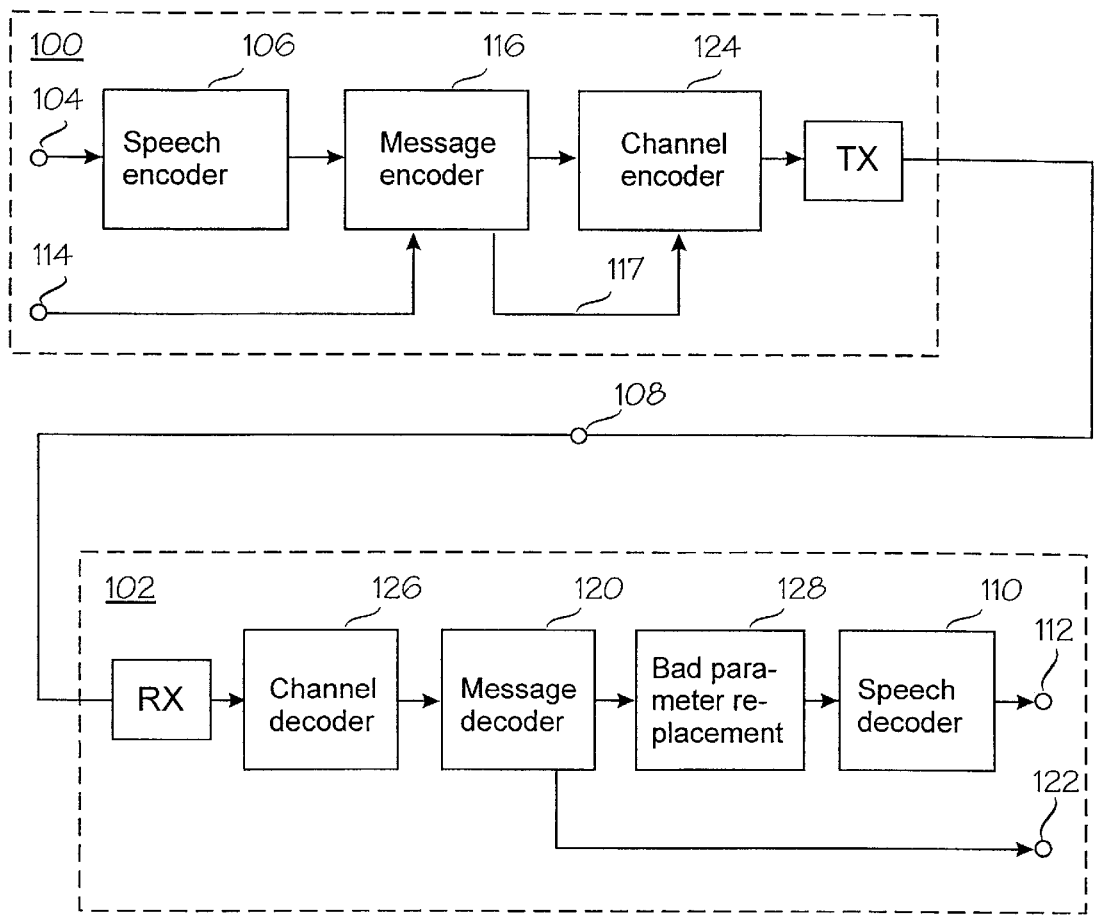
FIG. 4 shows an arrangement in accordance with the invention for transmitting messages.

FIG. 4 shows how the message encoding in accordance with the invention can be incorporated in a transmitter 100 and a receiver 102. (To render the figure illustrative, those functions of the transmitter which are shown below channel encoding in FIG. 2 are combined into block Tx, and those functions of the receiver which are shown below channel decoding in FIG. 2 are combined into block Rx.) Compared with the prior art transceiver shown in FIG. 3, the transmitter 100 of the invention combines the output signals of the speech encoder 106 and message encoder 116 into the same transmission channel 108. In the transmitter 100, the speech signal is encoded with a speech encoder 106, which may be of conventional type. The output signal of the message encoder 116 is applied to a channel encoder 124 in which the bits are protected against errors occurring in the channel 108. The messages 114 are inserted in the encoded speech signal in the message encoder 116, which inserts a bit pattern corresponding to the message in the frame. Furthermore, the message encoder 116 marks the frame that corresponds to the time of message transmission as bad (in the example of FIG. 4 by giving a signal 117 to the channel encoder 124, which inserts a faulty CRC value in the frame F). The channel encoder may otherwise be of conventional type, but it must distort the CRC value in response to the signal 117 from the message encoder. By placing the message encoder before the channel encoder, the messages can be protected by channel coding.

The receiver 102 in accordance with the invention separates the information arriving from the same transmission channel 108 into a speech channel 112 and a message channel 122. In the receiver 102, the bits are first applied to a channel decoder 126 which decodes the channel encoding. Thereafter the bits are applied to a message decoder 120 that detects the bad frames received, for example on the basis of a cyclic redundancy check (CRC) value. Having detected a bad frame, the receiver examines whether the frame contains a bit pattern corresponding to a predetermined message or differs from such a bit pattern in a few bits at the most. The identified messages are conveyed from the message decoder 120 to a message output 122, which corresponds to the message decoder output denoted by the same reference numeral in FIG. 3. An essential difference to the prior art arrangement shown in FIG. 3 is that in the arrangement of the invention, the speech and messages are transmitted via a common speech channel 108. In the prior art arrangement of FIG. 3, on the other hand, a separate channel 118, which is either a separate physical channel or a logical channel implemented by permanently allocating part of the transmission capacity of the speech channel for message transfer, must be provided for the messages. The signal is brought from the message decoder 120 via a block 128 for replacing bad speech frames to a speech decoder 110, which performs the decoding employed in that particular telecommunication system.

The transmitter 100 and receiver 102 may be integrated units, or they may be distributed as in the GSM system, for example, so that speech encoding and speech decoding are performed in the transcoder and channel encoding and channel decoding at the base station. Likewise, in FIG. 4 the boundaries between the different functional blocks are to be construed as operative rather than structural. This means, among other things, that the message encoder 116 and message decoder 120 need not necessarily be discrete physical entities, but with the increase in integration they may also be implemented with known equipment, e.g. in the form of software changes in a digital processor.

With reference to FIGS. 3 and 4, one possible negotiation protocol in accordance with the invention between the transcoder TRAU and the mobile station MS will be described in further detail hereinbelow. When establishing a connection, the transcoder TRAU finds out the type and/or features of the mobile station, such as the speech coding algorithms installed therein. The transcoder TRAU sends a message in accordance with the invention for example by distorting the check sum (Cyclic Redundancy Check value) for the speech frame employed between the transcoder TRAU and the base station BTS. In that situation, the base station BTS marks the frame as bad by changing the check bits at the air interface Um to be incorrect, as a result of which the mobile station interprets the frame as bad and checks whether the frame contains a message.

The mobile station MS responds to the inquiry sent by the transcoder TRAU by giving the speech coding algorithms installed therein. This is effected by forming an appropriate predetermined message. The message is transmitted in such a way that the mobile station MS changes the check bits employed in the channel coding to be incorrect and inserts a bit pattern corresponding to the message in the frame. The base station BTS will then interpret the received frame as bad and sends this frame further to the transcoder TRAU. In that connection, it is assumed that indication of the erroneousness or faultlessness of parameter groups, deduced on the basis of the error correction coding used by the telecommunication system or by some other means, is obtained from the channel decoder or some other part of the receiver.

Such an indication may be for instance the BFI (Bad Frame Indication) according to the GSM system. Error detection and identification of erroneous frames are discussed in GSM Specification 05.03 (Channel Coding). By using frames thus formed, signalling messages can be set as the content of the frames, as the data bits of the bad frames are sent as such up to the transcoder TRAU.

Such negotiations for determining the features of the other party are repeated in connection with a handover, since it is possible that the transcoder handling the call is also changed. The new transcoder is not aware of the speech coding method upon the use of which the mobile station MS agreed with the previous transcoder. Neither does it necessarily have the same features as the transcoder that was used prior to the handover. Therefore, prior to the handover or at least prior to an inter-MSC handover, one must change over to a speech coding method that is certain to be present in the new transcoder. In the same way, the echo cancellation method to be used over the connection between the transcoder and the mobile station can be negotiated.

The transcoder TRAU must separate the messages from the frames that have been corrupted on account of transmission errors. This is implemented for example in such a way that a given bit pattern or set of bit patterns corresponds to each predetermined message. How the message decoder can conclude whether the received bits contain a message will be described in the following. The number of the different messages possible is very small, e.g. about 20. The selected code words used for coding messages can, however, be very long, e.g. about 100 bits. Normally, a code word of 100 bits can be used for coding $2^{100}$ different messages; in view of this, such a code word is much longer than necessary. On account of a long code word, it is impossible in practice for a speech encoder 110 to produce one of the 20 selected message code words of e.g. 100 bits by chance, which code word would additionally be in a bad frame. The message decoder 120 can therefore examine the 100 bits used for message coding, and if they form one of the code words, they are interpreted as a message. Otherwise the bits are assumed to be normal speech coding bits. No special additional signal is therefore required to indicate whether a message is transmitted or not.

The above describes a negotiations-type two-way handshake. Alternatively, one party or both parties may spontaneously transmit messages informing the other party of their features. A feature upon the existence of which negotiations are conducted or information is sent is typically the capacity for different types of speech coding, echo cancellation and/or noise cancellation, and other features possibly to be added to the system. The sender may also directly command the receiver to use or not to use a given feature.

Preferred arrangements for selecting the bits are dealt with in Tables 1–4 in the present Applicants' PCT application WO97/16917, the text of which is incorporated herein by reference.

Transmission errors possibly occurring in channel 108 also have an effect on the implementation of the invention. If it is to be presumed that errors can occur in the transmission, the delivery of messages may be jeopardized. If the error probability in the channel is for example 1%, a message code word of 100 bits often contains one or more errors. This can be taken account of in the operation of the message decoder. It is usually not appropriate to implement the message decoder in such a way that a message is regarded as detected only if it is precisely the same as one of the predetermined message code words. In a practical implementation, the message decoder permits a certain number of errors in a message code word. If the received bit pattern deviates from a message code word for a maximum number of errors, the message is regarded as detected. The number of differing bits between two messages is called the Hamming distance between the messages. The possible messages should preferably be selected to provide a maximum Hamming distance between them. If a message is only accepted if it is received in exactly correct form, the probability for any speech frame to be corrupted into a bit pattern corresponding to the precisely correct message is practically zero. On the other hand, this creates the danger that a frame containing a message is corrupted to such an extent that the receiver cannot figure out the message. A predetermined threshold, e.g. 3 bits, can be set, so that the messages are accepted if they deviate from the ideal bit pattern corresponding to the message for this threshold value at most. Such a procedure increases the danger of a bit combination incidentally resembling a message code word appearing among the bits of the bad frames. An optimum compromise may be found, however, by selecting sufficiently long message code words and a sufficiently low permissible number of errors.

Other ways to increase redundancy include insertion of the bit pattern corresponding to the message at least twice in the same frame or transmission of the messages at least twice in different frames, in which situation a single successful reception is regarded as a message. In the last-mentioned case, it is preferable to send at least one normal frame between the messages, in which case the function of replacing bad frames will have a fresher good frame available. Furthermore, any disturbance is given more time to attenuate. Various techniques for increasing redundancy may also be used in combination.

When the same system comprises both "new" and "old" devices, the system will operate as follows. Let us assume at first that the transmitter is "new" and the receiver is "old". Such a situation would result if the message decoder 120 in FIG. 4 were removed. As stated above in connection with FIG. 4, the transmitter 100 codes the speech and, if necessary, replaces some of the speech coding bits with bits used for coding the message 114 and marks the frame as bad. The "old" receiver 102 does not comprise a message decoder 120, and the bits are supplied, after replacement of bad frames, directly to a speech decoder 110, which synthesizes the speech 112 to be heard. If the speech coding bits contain a message, the message will deteriorate the quality of speech to some extent. However, the deterioration will be only negligible, as has been explained above. The receiver 102 does not understand the message, but the speech connection is not essentially disturbed either.

In the reverse case, the transmitter is "old" and the receiver is "new", and the system will operate as follows. The transmitter 100 codes the speech as described above and supplies it to a channel 108. An "old" transmitter does not replace speech bits with message bits. The message decoder 120 of the receiver 102 examines whether the received bits contain a message. Since the message code words are very long, the occurrence of a message by chance among the bad frames is not possible in practice, wherefore the message decoder 120 supplies the bits (after replacement of bad frames) as such to a speech decoder 110, which synthesizes the speech 112 to be heard. The message decoder 120 thus never interprets the message 122. The receiver 102 operates in this case as a normal receiver in which the message transmission presently concerned is not implemented.

The preferred embodiments of the invention have been explained by way of example in the context of the GSM system and its derivatives. It is to be appreciated, however, that the embodiments, examples and words used are illustrative and not restrictive. Corresponding parts and parameters are to be found in many other digital telecommunications systems as well. It is obvious to those skilled in the art that as the technology evolves, the main idea of the invention can be implemented and the invention applied in a wide variety of ways. Hence, the invention and its embodiments are not restricted to the examples described above, but they can vary within the scope of the claims.

What is claimed is:

1. A method for transmitting messages and user information in a digital telecommunications system, the method comprising:

sending the user information via a transmission channel in transmission frames assigned to the user information, wherein each transmission frame has one of two states, the states being a good state and a bad state; for each different message, defining a corresponding unique bit pattern;

unique bit for each individual message, placing the corresponding bit pattern into a transmission frame;

transmitting each message by marking as the message at least one transmission frame which is assigned to the user information; and restricting the number of consecutive frames marked as messages to a sufficiently low number so as not to substantially impair the quality of the user information, wherein the marking substantially consists of inserting a bit pattern corresponding to the message into the at least one transmission frame and setting the state of the transmission frame to bad.

2. The method of claim 1, wherein the content of the message corresponds to at least one of the type and feature of the transmitter or the lack of such a feature.

3. The method of claim 2, wherein the feature of the transmitter is at least one of its capacity for various speech coding, echo cancellation and noise cancellation operations.

4. The method of claim 1, further comprising inserting the bit pattern corresponding to the message in the same frame at least at two different locations.

5. The method of claim 1, further comprising inserting the bit pattern corresponding to the message in at least two different frames.

6. The method of claim 5, wherein at least one good frame is transmitted between the two frames containing the bit pattern corresponding to the same message.

7. The method of claim 1, wherein the number of consecutive frames marked as messages is one.

8. The method of claim 1, wherein the number of different messages is about 20.

9. A method for receiving messages and user information in a digital telecommunications system, the method comprising:

for each different message, defining a corresponding unique bit pattern;

receiving the user information and the messages via a transmission channel in frames, each of which having one of two states, the states being a good state and a bad state, wherein a bad frame is at least partly replaced by a preceding good frame; and detecting the frames containing a message, said detecting substantially consisting of identifying a bad frame which additionally contains a bit pattern which deviates from a bit pattern corresponding to a message at most by a predetermined threshold value.

10. The method of claim 9, wherein the content of the message indicates how a receiver should use or not use a feature thereof.

11. The method of claim 10, wherein the feature of the receiver is at least one of its capacity for various speech coding, echo cancellation and noise cancellation operations.

12. The method of claims 1 or 9, wherein the number of different messages is very small compared to the total number of possible bit patterns, and the bit patterns corresponding to the different messages are selected so as to maximise a Hamming distance between them.

13. The method of claim 9, wherein the predetermined threshold value is about 3 differing bits.

14. The method of claim 1 or 9, wherein the digital telecommunications system is a mobile communications system and the transmission channel comprises a radio channel.

15. The method of claim 14, wherein the transmission channel is a speech channel of a mobile communications system.

16. The method of claim 1 or 9, wherein a bad frame is indicated by a checksum value sent together with the frame, which value does not correspond to the checksum obtained from the frame by calculation.

17. A transmitter for transmitting user information and messages in a digital telecommunications system, the transmitter comprising:

a user information encoder in which the user information to be transmitted is encoded into frames, each of which has one of two states, the states being a good state and a bad state;

a message encoder for converting each different message to a corresponding unique bit pattern;

transmitting means for transmitting the encoded user information and the messages via a transmission channel, wherein the transmitter is adapted to transmit each message by marking as the message at least one transmission frame which is assigned to the user information and restrict the number of consecutive frames marked as messages to a sufficiently low number so as not to substantially impair the quality of the user information and wherein the marking includes inserting the bit pattern corresponding to the message into the at least one transmission frame and setting the state of the transmission frame to bad.

18. The transmitter of claim 17, wherein the number of consecutive frames marked as messages is one.

19. A receiver for receiving information and messages in a digital telecommunications system, the receiver comprising:

receiving means for receiving a signal via a transmission channel in frames wherein each frame has one of two states, the states being a good state and a bad state;

a user information decoder operationally coupled to the receiving means for generating decoded user information, and replacing means for replacing a bad frame at least partly with a preceding good frame;

a message decoder operationally coupled to the receiving means for decoding the messages, wherein for each different message, a corresponding unique bit pattern has been defined, wherein the receiver is adapted to detect a frame which contains a message and that the detecting is based only on identifying a bad frame which additionally contains a bit pattern which deviates from a bit pattern corresponding to a message at most by a predetermined threshold value.

20. The transmitter of claim 17 or the receiver of claim 16, wherein the number of different messages is very small compared to the total number of possible bit patterns, and the bit patterns corresponding to the messages are selected so that a Hamming distance between them is as great as possible.

21. The transmitter of claim 20, wherein the number of different messages is about 20.

22. The transmitter of claim 17 or the receiver of claim 19, wherein the digital telecommunications system is a mobile communications system and the transmission channel comprises a speech channel of a mobile communications system.

23. Use of a bad frame indicator as the only indicator in a digital telecommunications system, for indicating that a frame containing a bit pattern which deviates from a bit pattern corresponding to a message at most by a predetermined threshold value, contains a message instead of user information.

24. A transmission signal in a digital telecommunications system wherein user information is transmitted in frames each of which has one of two states, the states being a good state and a bad state, wherein a bad frame is at least partly replaced by a preceding good frame, and for each different message, there is a corresponding unique bit pattern, wherein, during the time of transmitting the message, the transmission signal has predetermined differences from a transmission signal with similar user information but without the message, and the predetermined differences are substantially restricted to the corresponding frame which has a bad state and contains a bit pattern which deviates from a bit pattern corresponding to a message at most by a predetermined threshold value.

* * * * *

UNITED STATES PATENT AND TRADEMARK OFFICE
CERTIFICATE OF CORRECTION

PATENT NO.     : 6,633,536 B1
DATED          : October 14, 2003
INVENTOR(S)    : Jyri Suvanen It is certified that error appears in the above-identified patent and that said Letters Patent is hereby corrected as shown below:

<u>Title page</u>,
Item [56], References Cited, add:
-- U.S. PATENT DOCUMENTS
5,255,343     10/1993     Su
5,491,719     02/1996     Sellin et al.
4,476,559     10/1984     Brolin et al.
5,305,353     04/1994     Weerackody --; add:
-- FOREIGN PATENT DOCUMENTS
WO    93/10623     05/1993     A.G. Davis
GB    2 218 596    11/1989     W. Fushimi
EP    651 523      05/1995     Y. Saegusa
WO    97/16917     05/1997     P. Haavisto
FI    955266       05/1997 --; add
-- OTHER PUBLICATIONS
Linear Block Codes, Chap 3, Sec. 33, "The minimum distance of a block code," p. 62-77 (1994). --

Item [57], ABSTRACT, replace current Abstract with the following Abstract:
-- In a method, transmitter and receiver for transmitting messages in a digital telecommunications system, information to be send is encoded in the transmitter's information encoder into frames transmitted via a transmission path to the receiver. Good and bad states are defined for the frames and a bit pattern corresponding to each message is defined. Messages are encoded with the transmitter's message encoder and transmitted to the receiver. Messages are transmitted together with information via a common transmission path, inserting a bit pattern corresponding to the frame's message, from the frame corresponding to the time of transmitting the message as bad, and in short sequences.

UNITED STATES PATENT AND TRADEMARK OFFICE
CERTIFICATE OF CORRECTION

PATENT NO. : 6,633,536 B1
DATED : October 14, 2003
INVENTOR(S) : Jyri Suvanen

It is certified that error appears in the above-identified patent and that said Letters Patent is hereby corrected as shown below:

<u>Title page (cont'd),</u>
Messages transmitted can be received together with the information via a common transmission path simply by detecting a bad frame that also contains a bit pattern deviating from the bit pattern corresponding to the message in a few bits at most. --

Signed and Sealed this

Fifteenth Day of June, 2004

JON W. DUDAS
*Acting Director of the United States Patent and Trademark Office*